July 2, 1940.  C. E. SWIFT  2,206,375
METHOD OF WELDING COPPER AND COPPER ALLOY CLAD STEEL
Filed May 12, 1938
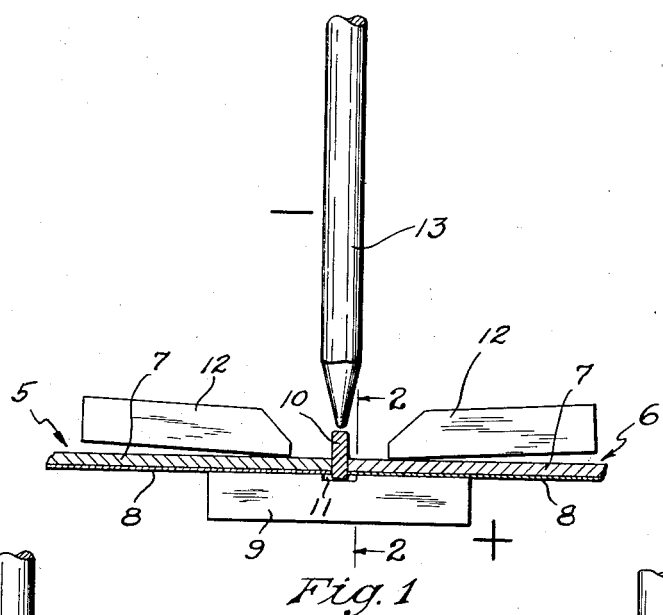
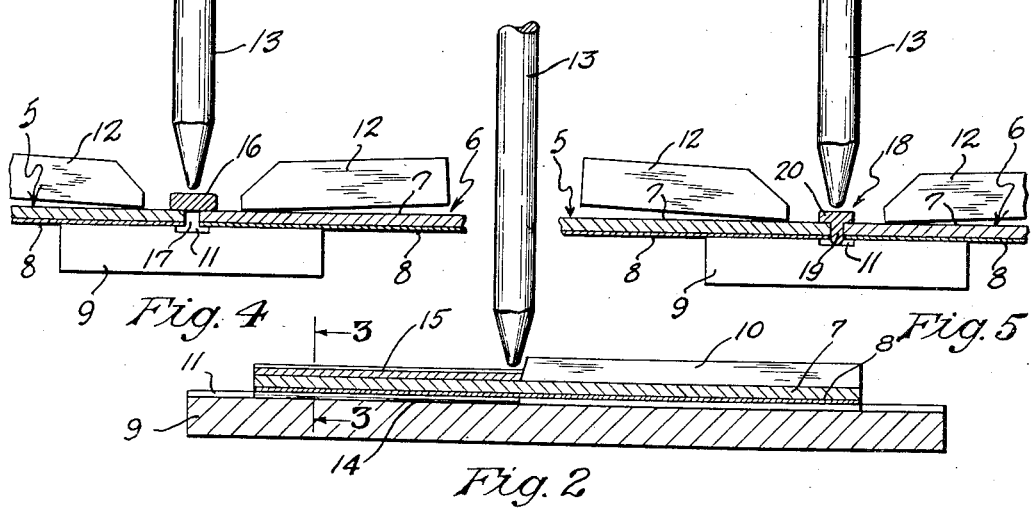
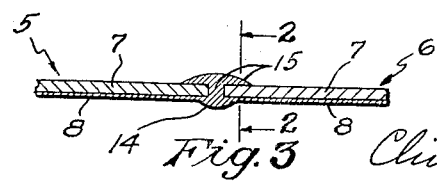
INVENTOR
Clinton E. Swift
BY
Wooster & Davis
ATTORNEYS Patented July 2, 1940

2,206,375

UNITED STATES PATENT OFFICE 2,206,375

METHOD OF WELDING COPPER AND COPPER ALLOY CLAD STEEL

Clinton E. Swift, Milford, Conn., assignor to The American Brass Company, Waterbury, Conn., a corporation of Connecticut Application May 12, 1938, Serial No. 207,543

7 Claims. (Cl. 219—10)

This invention relates to a method of welding duplex metal members, more particularly to welding members comprising a ferrous metal base, such for example as steel or an iron alloy and to which base metal is bonded a copper or copper alloy, but the method is not limited to this material but may be used to weld duplex metals of different combinations of metals, and it is an object of the invention to provide a method of welding whereby the weld may be completed from one side only of the material and cause a welding of the bonded metal to give a continuous unbroken surface layer of this metal, and also to bond to the base metal so as to connect the same in a manner to give the required strength.

In the accompanying drawing forming a part of this specification I have illustrated the preferred manner of using this method, it being understood that various changes and modifications may be employed within the scope of the invention.

In this drawing:

Fig. 1 is a transverse vertical view showing the members to be welded in section and with the other elements in elevation;

Fig. 2 is a longitudinal section substantially on line 2—2 of Fig. 1;

Fig. 3 is a transverse sectional view of the completed joint;

Fig. 4 is a view similar to Fig. 1 showing a modification; and

Fig. 5 is a similar view showing another modification.

In the example illustrated I have shown two edge portions of sheet metal 5 and 6 comprising a duplex or bi-metal composed of a base metal 7 and a different metal 8 bonded to one side thereof. As a specific example the base 7 may be of ferrous metal, such as an iron alloy or steel to one face of which is bonded a suitable thickness 8 of a copper or copper alloy, such for example as a copper-silicon alloy containing about 3% silicon and a third element generally of about 1%, (such for example as manganese or zinc), but as will later be described my method is not limited to this combination but may be used for welding other duplex metals.

This metal is known in the trade as "clad" metal and is usually made by bonding the copper or copper alloy to a slab or ingot of the ferrous metal and rolling down the resulting slab or ingot to proper gauge or thickness, but of course this method may be used with any combinations of the so called "clad" metal or a combination of iron, steel or iron alloys and copper or copper alloys, or other duplex metals as will be further disclosed. Usually the bonded metal 8 is about 20 percent of the total thickness of the duplex metal.

This method of welding is particularly adapted for welding water storage tanks, such as are used for kitchen water heaters and similar devices where it is desired to produce a tank comprising iron or steel lined with a non-rusting or corrosion resistant metal such as copper or copper alloy, and where due to the size of the tank it is difficult to get access to the interior and the lining material to properly weld it from the inside.

In carrying out this process a copper backing bar 9 may be placed against the inner material 8 to extend longitudinally of the joint, the duplex metal members 5 and 6 being located with edges in spaced relation and against the opposite sides of a filler bar 10. The backing bar 9 has a longitudinal recess 11 in its upper surface in alignment with the joint to permit a certain amount of the welding metal to collect at the under side of the joint and be retained by this bar while in the molten condition. The filler rod 10 may be of different shapes but I prefer to make it of substantially rectangular cross section and to place it on edge, as shown, between the opposed free edges of the members 5 and 6 and preferably with these edges engaging the opposite sides of the rod. Also, it is preferred that the rod extend above the upper surfaces of the members 5 and 6 to be welded. It is also preferred to provide hold-down fingers 12 of copper or copper alloys which are good conductors of heat and position them on opposite sides of the joint to prevent overheating of the metal and keep the metal spaced from the joint relatively cool. Then the filler rod is melted down by an arc between the carbon electrode 13 and the filler rod, the rod being melted down by this carbon arc progressively along the rod and the joint as indicated in Fig. 2. As is usual in this type of welding the carbon electrode is made the negative electrode and the metal the positive electrode.

This filler rod is preferably substantially the same metal as the bonded metal 8, and as it is melted down it melts the metal 8 at the joint and welds with this metal to form a continuous joint or layer of this metal as shown at 14 in Fig. 3, and the base metal 7 is heated to a sufficient temperature to bond with the metal of the filler rod, but the base metal 7 is not melted or fused, and therefore the edges of the base metal 7 are securely brazed or bonded together by the filler rod metal as shown at 15 in Fig. 3. Thus when the joint is completed it will be seen that the steel or iron alloy member 7, or shell of the tank, is lined on the inner side with a continuous uninterrupted layer of the copper or copper alloy, effectively protecting the ferrous metal from contact with the contents of the tank.

In Figs. 4 and 5 are shown modified arrangements which are more satisfactory in certain respects. In Fig. 4 the filler rod 16 is located across the space 17 between the edges of the clad members 6 and 7 to be welded, while in Fig. 5 the bar 18 is of substantially T shape with the leg 19 located between the edges of members 5 and 6 while the cross bar 20 rests on top of these members and extends over the space between their edges. In the welding operation the rod 16 or 18 is melted down progressively along the joint by means of the arc the same as in the first form, and the metal runs into and fills the space between the edges of the members 5 and 6 and welds with the bonded metal 8 and bonds to the base metal 7. Experience has shown that the iron pick-up in the weld metal with the arrangements of Figs. 4 and 5 is less than in that of Fig. 1. Apparently the reason for this is that with the rod located as in Fig. 1 the arc plays on the corners of the steel or base metal 7 and diffuses appreciably more iron into the weld metal, whereas with the rod shaped and located as in Figs. 4 and 5 these edges of members 7 are protected during the melting down of the rod.

As above suggested I am not limited in this process to the use of duplex metal comprising iron or steel and copper or copper alloys, but I may use any combination of metals of different melting points where the metal of lower melting point is bonded with the metal of the higher melting point, and with which a filler rod of metal similar to the bonded metal, or of metal which will melt or weld with this bonded metal, and will bond with the base metal without melting or fusing the base metal, may be used. In other words this method may be used where the bonded metal melts at a lower temperature than the base metal and in the welding operation the base metal is not melted or fused but is heated to a sufficient temperature to bond with the weld metal.

I am also not limited to the use of the carbon arc, but in welding certain combinations of metal I may use the oxyacetylene torch. For example with high zinc copper alloys, such for example as Muntz metal (60—40 brass) as the welding metal or filler rod I can use the oxyacetylene torch, but it will be understood the use of a carbon arc or the acetylene torch, or either one will be determined by the welding alloy used.

Also, it is not necessary that the filler rod be rectangular as I can use round or other shapes, but the rectangular filler rod is preferred for this purpose.

It will be seen from the above that the complete welding and brazing of this joint can be accomplished by operations entirely on the outer side or the side of the base metal, and in the resulting joint there is a continuous unbroken layer of the bonded metal at the inner side of the joint effectively protecting the base metal from the contents of the tank or from other material from which it is desired to protect this metal, and that the filler metal is effectively brazed or bonded to the free edges and adjacent surfaces of the base metal, effectively connecting the same to give the required strength to the joint.

Having thus set forth the nature of my invention, what I claim is:

1. A method of welding sheets of duplex metal comprising a ferrous base metal with a sheet of metal comprising principally copper bonded to one side thereof, comprising locating edges of the duplex sheets in opposed relation with the base metal uppermost and with like layers of the two duplex metal sheets disposed on the same side, respectively, locating a filler rod of metal similar to the bonded metal adjacent these edges and extending above the surfaces of the sheets, and melting down the filler rod progressively along the joint by playing a flame on the top of the filler rod and heating to a temperature to weld with the bonded metal to form a continuous layer and bond to the ferrous metal without melting of the base metal to connect the edges thereof.

2. A method of welding sheets of duplex metal comprising a base metal with a sheet of metal having a lower melting point than the base metal bonded to one side thereof, comprising locating the duplex sheets with edges in opposed relation with the base metal uppermost and with like layers of the two duplex metal sheets disposed on the same side, respectively, locating a filler rod adjacent said edges and extending above the surfaces of the sheets composed of a metal having the characteristics of welding with the bonded metal and bonding to the base metal without melting the base metal, and melting down the filler rod progressively along the joint by applying a flame to the top of the filler rod and heating to a temperature to weld with the bonded metal to form a continuous lining and bond to the base metal without melting of the base metal to connect the edges thereof.

3. A method of welding comprising placing in spaced opposed relation two edges of duplex sheet metal including a ferrous base metal and a sheet of metal comprising principally copper bonded to one side thereof, the duplex metal being disposed with the base metal uppermost and with like layers of the two duplex metal sheets on the same side, respectively, placing between said edges a flattened filler rod composed of metal comprising principally copper and with one edge extending above the upper surfaces of the sheet metal, and melting down the filler rod progressively along the joint by applying a flame to the upper edge thereof and heating to a temperature to weld with the bonded metal to form a continuous lining and bond to the ferrous base metal without melting of the base metal to connect the edges thereof.

4. A method of welding comprising placing in spaced opposed relation two edges of duplex sheet metal including a ferrous base metal and a sheet of copper alloy bonded to one side thereof, the metal being arranged with the base metal uppermost and with like layers of the duplex metal disposed on the same side, respectively, placing between said edges a substantially rectangular filler rod composed of a copper alloy similar to that of the bonded metal and arranged with one edge of the rod extending above the upper surfaces of the sheet metal, and melting down the filler rod progressively along the joint by a carbon arc on the upper edge thereof and heating to a temperature to cause the filler metal to weld with the bonded metal to form a continuous lining of copper alloy and bond with the ferrous base metal without melting of the base metal to connect the edges thereof.

5. A method of welding sheets of duplex metal comprising a base metal with a sheet of metal having a lower melting point bonded to one side thereof, comprising locating the duplex sheets with edges in opposed spaced relation and with like layers of the two duplex metal sheets disposed on the same side, respectively, locating a substantially T shaped filler rod of a metal similar to the bonded metal with its upright leg between said edges and the cross bar bridging the space between and overlapping said edges and contacting the base metal, and melting down the filler rod progressively along the joint by applying a flame to the top of the cross bar and heating to a temperature to weld with the bonded metal to form a continuous lining and bond to the base metal without melting of the base metal to connect the edges thereof.

6. A method of welding duplex sheet metal comprising a base metal with a sheet of metal having a lower melting point than the base metal bonded to one side thereof, comprising placing in spaced opposed relation two edges of the sheet metal with the base metal outermost and with like layers of the two duplex metal sheets on the same side, respectively, locating a filler rod of a metal similar to the bonded metal adjacent said edges and overlapping the edges of the base metal, and melting down the filler rod progressively along the joint by a flame applied to the outer exposed surface of the rod and heating to a temperature to weld with the bonded metal to form a continuous surface and bond to the base metal without melting of the base metal to connect the edges thereof.

7. A method of welding duplex sheet metal comprising a ferrous base metal with a sheet of metal comprising principally copper bonded to one side thereof, comprising locating in spaced opposed relation two edges of the sheet metal with the base metal outermost and with like layers of the two duplex metal sheets on the same side, respectively, locating a filler rod of metal similar to the bonded metal at said edges and overlapping the edges of the base metal, and melting down the filler rod progressively along the joint by a flame applied to the outer exposed surface of the rod and heating to a temperature to weld with the bonded metal to form a continuous layer and to bond to the base metal without melting of the base metal to connect the edges thereof.

CLINTON E. SWIFT.